July 3, 1945.   R. W. CLINKSCALE ET AL   2,379,424
CABLE CONNECTOR
Filed Dec. 18, 1941

INVENTOR
R. W. CLINKSCALE
BY W. McL HAGUE
E. W. SYLVESTER
ATTORNEY

UNITED STATES PATENT OFFICE 2,379,424

CABLE CONNECTOR

Roy W. Clinkscale, Vallejo, Calif., and Wesley McL. Hague and Evander W. Sylvester, United States Navy Application December 18, 1941, Serial No. 423,470

4 Claims. (Cl. 287—125)

(Granted under the act of March 3, 1883, as amended April 30, 1928; 370 O. G. 757)

Our invention relates generally to a connector for joining the adjacent ends of objects which are to be coupled together.

More particularly, our invention relates to connectors of the quick-detachable type which may be utilized, for example, in joining adjacent ends of a cable.

An object of the invention is to provide an improved connector which permits cable ends to be quickly coupled and uncoupled in a positive locking action.

Another object is to provide a two-part cable connector which is positive in its locking action but which may be uncoupled quickly by rotating the parts relative to one another through an acute angle.

Another object of our invention is to provide a two-part connector for electrical conductors which may be coupled and uncoupled quickly and which permits a positive electrical connection between adjacent conductors.

A further object is to provide a connector particularly adapted for connecting together electrical conductors which carry heavy currents such as current supply cables for welding apparatus.

A specific object of our invention is to provide a cable connector which effects coupling through a combination of frictional engagement and threaded engagement between complementary parts.

A more specific object of our invention is to provide a two-part quickly detachable connector for electrical conductors, the parts being united by combined action of frictional engagement between complementary tapered surfaces and threaded engagement between a stud and its complementary threaded recess.

Another specific object of our invention is to provide a quickly detachable connector for joining adjacent ends of electrical conductors utilizing the combined locking actions of complementary interrupted threaded members and frictional engagement between complementary members having internal and external surfaces of frusto-conical contour respectively.

These and other objects will become apparent from the following detailed description of our invention and from the accompanying drawing, in which like numbers are employed to designate like parts throughout the same.

In joining adjacent ends of cables, particularly cables designed for carrying heavy electrical currents such, for example, as are used in supplying current for electrical welding, it is essential that the coupling between the cables be effected in such a manner as to limit the voltage drop thereacross to the least possible value in order that the welding apparatus may function satisfactorily. Or, stated in another manner, the electrical resistance of the coupling should be kept at a minimum.

The resistance value of the coupling is a function of the "tightness" with which the complementary terminals of the connector are put together and also varies inversely with the cross-sectional area of the connector terminals.

If the connector does not have sufficient cross-sectional area, the voltage drop between the source of voltage and the apparatus will be excessive. Likewise, if the coupling is not tight, the resistance rises. A loose coupling will also produce undesirable heating thereof since heat generated also varies directly with the resistance.

Also in the interest of efficiency, another essential is that the coupling should be so designed as to permit the complementary terminals to be connected and disconnected in the least possible time. Further, the coupling should be positive in its locking action so that the terminals cannot be accidentally pulled apart.

We believe that our device meets all of the aforesaid essentials and that it constitutes a distinct improvement over prior art structures.

Figure 1:
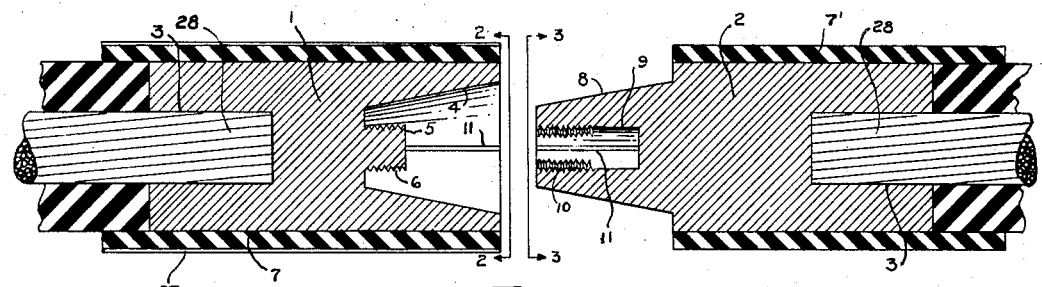
Fig. 1 is a longitudinal section through the axis of one embodiment of our improved connector as applied to cable ends.
Figure 2:
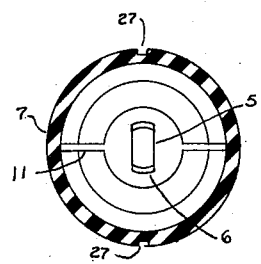
Fig. 2 is an end view of the left-hand terminal of the connector shown in Fig. 1 taken on line 2—2 thereof.
Figure 3:
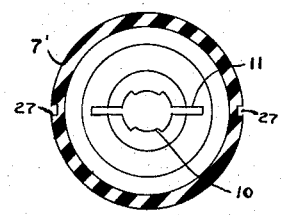
Fig. 3 is an end view of the right-hand terminal of the connector shown in Fig. 1 taken on line 3—3 thereof.

Referring now to Figs. 1, 2 and 3 of the drawing, our improved connector comprises a pair of terminals or body members 1 and 2, which are complementary in structure and made of any good conductive material, such as copper.

Each such terminal is provided with means at one end thereof for receiving a cable end. Although the particular means shown consists of a recess 3 into which the bare cable end 28 may be inserted and fixed therein by soldering, it is considered to be exemplary only and not a limitation of our invention, since other well known means for attaching the cable ends to the terminals will readily suggest themselves to those skilled in this art.

The other end of terminal 1 is provided with an internal tapered surface 4 of frusto-conical contour, at the base of which is formed a stud 5 having an interrupted male thread 6 machined thereon.

For purposes of insulation, a sleeve 7 made of any suitable insulating material surrounds the exposed surface of the body portion of the terminal body.

The other end of the terminal 2 is provided with an external tapered surface 8 of frusto-conical contour into which is bored axially a recess 9. Interrupted female threads 10 of the same type as cut on stud member 5 are also provided in the recess 9.

An insulating sleeve 7' is likewise provided for the exposed body portion of terminal 2.

The coupling between terminals 1 and 2 is made by inserting the stud 5 within the recess 9 and rotating the terminals relative to one another, whereupon the threads 6 and 10 of the stud and recess respectively will effect engagement and draw the complementary external and internal tapered surfaces 4 and 8, respectively into frictional engagement.

We prefer to so proportion the relative sizes of the complementary tapered portions and the pitch of the threaded stud and recess so that frictional engagement between the tapered surfaces is obtained when the terminals 1 and 2 have been rotated relative to each other through an acute angle of approximately 30°. This feature permits the terminals to be quickly connected and disconnected.

In order to permit members 1 and 2 to be joined together quickly by tactile sense alone, insulating sleeves 7 and 7' respectively may be provided with slots 27 therein. These slots are arranged with respect to the interruptions of the threads on stud 5 and its complementary recess 9, so that the stud will be in position for insertion into the recess when the slots 27 in the insulating sleeves 7 and 7' are in axial alignment with each other. If increased locking action is desired, slots 11—11' may be respectively provided in the external and internal tapered surfaces.

Figure 4:
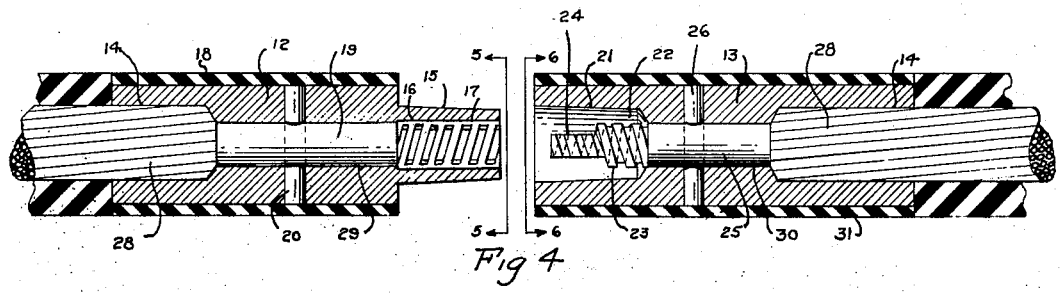
Fig. 4 is a longitudinal section through the axis of a second embodiment of our connector as applied to cable ends.
Figure 5:
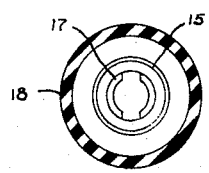
Fig. 5 is an end view of the left-hand terminal of the connector shown in Fig. 4 taken on line 5—5.
Figure 6:
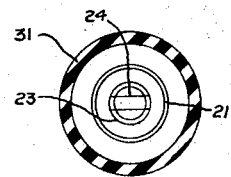
Fig. 6 is an end view of the right-hand terminal of the connector shown in Fig. 4 taken on line 6—6 thereof.

In Figs. 4, 5 and 6 we have illustrated a second embodiment of our improved connector.

Referring now to Fig. 4 in particular, the connector comprises a pair of body members or terminals 12 and 13, which are complementary in structure and made of a good conductive material.

As in Fig. 1, each of the members 12 and 13 is provided with a recess 14 for receiving the bare cable ends 28.

The opposite end of the terminal 12 is provided with an external tapered surface 15 into which is bored axially a recess 16. Interrupted female threads 17 are provided therein and an insulating sleeve 18 is provided for covering the exposed conductive body portion of the terminal 12. It will be seen that the body portion 12 also contains an axial bore 29 therethrough. A plug member 19 is insertable therein and is secured in position by a pin member 20. The purpose for this plug insert will be explained hereinafter.

The opposite end of the body portion 13 is provided with an insulating sleeve 31, an internal tapered surface 21 and contains a bore 30 therethrough to permit insertion of a stud member 22. Stud 22 contains an intermediate full threaded section 23 and an end section 24 having interrupted threads thereon. The opposite end 25 of stud 22 is of such diameter as to permit a close fitting thereof within the central axial bore 30 of member 13. A pin 26 is insertable through the body portion 13 and end portion 25 of stud 22 to hold the latter in position.

Coupling between members 12 and 13 is effected by inserting the interrupted threaded end 24 of stud 22 within its complementary threaded recess 17 and rotating the terminals relative to one another. The threaded portions of the stud and recess will effect engagement and draw the complementary tapered surfaces 15 and 21 into frictional engagement.

As with the structure illustrated in Fig. 1, we prefer to proportion the dimensions of the complementary tapered surfaces and the pitch of the threaded stud and recess so that frictional engagement is effected between the tapered surfaces when the terminals 12 and 13 have been rotated relative to each other through a small angle. When members 12 and 13 are rotated relative to one another, we also prefer that the fully threaded intermediate section 23 of stud 22 effect engagement with the threaded recess 17. Substantially the same benefits can be obtained, however, when the full threaded section 23 of stud 22 is eliminated, thereby providing only the interrupted male threaded end portion 24 for engagement with the threaded recess 17.

The various elements, as shown in Fig. 4, may be assembled as follows: Stud 22 is inserted within the axial bore 30 of member 13 and is so positioned along the longitudinal axis of the bore that when the end 24 thereof is inserted within the recess 17 and the terminals 12 and 13 rotated relative to each other, frictional engagement between complementary tapered surfaces 15 and 21 will occur after elements 12 and 13 have rotated through an angle of approximately 30°.

With members 12 and 13 thus engaged, stud 22 is then secured in a fixed position axially of the bore of member 13 by drilling an opening transversely through members 13 and 25 and inserting therethrough the dowel pin 26.

In order to make the connector a good electrical conductor with a minimum voltage drop thereacross, the plug 19 is then inserted within bore 29 of member 12. Plug 19 is secured in such position by inserting pin member 20, in a manner similar to that hereinbefore described with respect to the insertion of dowel pin 26.

While our invention has been described in particular with respect to its application for coupling cable ends together, it is obvious that the coupling principles disclosed may be utilized for coupling other objects, and also that variations may be made in the structures illustrated in Figs. 1 and 4 without departing from the spirit and scope of our invention.

It is therefore our intention that only such limitations shall be placed on the appended claims as are made necessary by the prior art.

The invention described herein may be manufactured and used by or for the Government of the United States of America for governmental purposes without the payment of any royalties thereon or therefor.

Having now fully described our invention, what we claim is:

1. A quick-detachable two part connector, the first part including at one end a recess having a conical surface and an axially positioned stud therein having male interrupted threads, the second part including at one end an external conical surface and an axially extending recess having female interrupted threads, the interruptions of said threads in each part being so oriented and the threaded stud of the first part being so positioned along the axis of the conical recess of the first part that when the external conical surface of the second part is entered into the conical recess of the first part, and the conical surfaces thereby brought into contact with each other, the male interrupted threads on the stud of the first part are in position for engagement with the female interrupted threads in the recess of the second part, and said connector parts may then be tightly joined by a slight rotation of the parts relative to each other.

2. The combination in claim 1 wherein said threaded stud constitutes a separate part secured within the conical recess of said first part.

3. The combination in claim 1 wherein at least one of said conical surfaces is split.

4. The combination in claim 1 wherein said stud is provided with a pair of oppositely disposed threaded portions and oppositely disposed flattened sides therebetween, the distance between said flattened sides being substantially less than the diameter of said threaded portions.

ROY W. CLINKSCALE.
WESLEY McL. HAGUE.
EVANDER W. SYLVESTER.